United States Patent Office 3,262,852
Patented July 26, 1966

3,262,852
VASODILATOR AND ANTI-ANGINOSE COMPOUNDS CONTAINING METHOXY BENZYL PIPERAZINES AND METHOD OF USING THE SAME
Jacques Servier, Neuilly-sur-Seine, France, assignor to the Société Anonyme dite: "Biofarma," Neuilly-sur-Seine (Seine), France, a society organized under the laws of France
No Drawing. Filed Nov. 23, 1962, Ser. No. 256,186
Claims priority, application France, June 30, 1960, 831,847
8 Claims. (Cl. 167—65)

The present invention relates to therapeutic applications of methoxy-benzyl-piperazines of the formula:

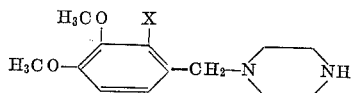

wherein X is hydrogen or $OCH_3$ and of their pharmaceutically compatible organic and inorganic salts.

This is a continuation-in-part of my earlier applications Serial No. 758,691, filed September 3, 1958, and Serial No. 84,747, filed January 25, 1961, now both abandoned.

These products have very valuable pharmacological properties especially as peripheral vasodilators; they may be employed in the pure state, or in the form of salts of mineral or organic acids which are pharmaceutically compatible. It has been proved that these products possess interesting and prolonged vasodilator properties. Such action is exerted both on the peripheral circulation and on the coronary arteries. The mechanism of that action is purely peripheral, being exerted on the smooth fibers of the vessels without any action on the autonomous nervous system. These derivatives may be used in the treatment of various circulatory disorders such as arteritis or coronary insufficiency.

When injected to a chloralosed dog in a dose of from 0.25 to 0.50 mg./kg. and the femoral output determined by means of Shipley-Wilson's rotameter, it is found to increase the femoral blood output rate in an amount of from 50 to 80% without altering the general arterial pressure.

The fact that the vasodilator activity is of peripheral origin is demonstrated by the following findings:

(1) The compounds of the invention do not induce any drop in arterial pressure when injected intracisternally.

(2) The compounds have hypotensor activity in the spinal cat (an animal is said to be spinal when the whole brain including the medulla is destroyed after division of the spinal cord high in the cervical region).

(3) The compounds are active even when administered to a test animal treated 24 hours with reserpine.

(4) When injected directly into the dog's femoral artery it dilates the vessels of the paw.

As earlier mentioned the compounds of the invention have an especially effective vasodilator action in regard to the coronary vessel. In particular the compounds oppose myocardic anoxia in the rat, as would otherwise be caused by intravenous injection of 1 I.U. posterior pituitary extract. The protection thus ensured is more effective than that provided by papaverine and iproniazide.

Further, the compounds have adrenolytic and noradrenolytic activity. From 1 to 2 mg./kg. of the compounds serve to reduce the hypertensor effects of adrenaline and noradrenaline both upon the arterial pressure and on the nictitating membrane of the cat.

In clinical tests, these products given in the form of tablets containing 1 mg. of the compounds have given highly satisfactory results in connection with general blood circulation, especially in cases of arteritis and coronaritis, and more generally in all cases where vasodilator action is required.

The doses used were in the range from 1 to 10 mg. a day. Such doses are considerably lower than the toxic doses so that an ample therapeutic margin is available. The toxic doses have been tested on the mouse; $LD_{50}$ values were about 125–135 mg./kg. in intravenous injection and about 305–315 mg./kg. intraperitoneally.

Various excipient may be used with the compounds of the invention, and the following excipient composition is given by way of example only, 1 mg. tablet containing 2,3,4-trimethoxybenzyl-piperazine or 3,4-dimethoxybenzyl-piperazine:

| | Mg. |
|---|---|
| Gum tragacanth | 0.5 |
| Lactose | 55.0 |
| Starch | 59.6 |
| Sugar | 31.0 |
| Paraffin oil | 0.4 |
| Magnesium stearate | 0.5 |

The methoxy-benzyl-piperazines may be prepared by condensing mono-formyl piperazine with di-or tri-methoxy benzyl chloride. A practical example of the procedure is given below:

Mono-formyl-piperazine is reacted molecule for molecule with 3,4-dimethoxy-benzyl chloride in the presence of one and one-half molecule of soda carbonate and in suspension in ethyl alcohol, during 2 to 3 hours.

The reaction product is filtered and the filtrate is evaporated in vacuo to remove the alcohol. There remains an oily product from which the excess formyl-ethylene diamine is removed by distillation under 1 mm. Hg pressure up to 125° C. The dark yellow, residual product is treated with 10% hydrochloric acid at 100° C. for 12 hours to eliminate the formyl group; it is evaporated to a syrupy consistency and taken up with ethyl alcohol at the boiling point until complete miscibility is attained; it is then discolored over carbon, filtered and stored at low temperature.

The 3',4'-dimethoxybenzyl-di-ethylene diamine dihydrochloride precipitates as white needles; the precipitate is drained and washed with anhydrous sulfuric ether. Melting point: 222–226° C.

In a similar way 2,4,3-trimethoxy-benzyl-piperazine has been prepared, having a boiling point of 200–205° C. at 2 mm. Hg, and the di-hydrochloride of which has a melting point of 225–228° C. as determined by the heated block test.

While in the above description the hydrochloride salt is used as an example, any pharmaceutically compatible salt of the free bases may be used.

It will be understood that the above examples of preparation are given by way of illustration only, and that modifications can be made to the various forms of preparation described, within the field of technical equivalence without thereby departing from the spirit or from the scope of the present invention.

What is claimed is:

1. A method of producing peripheral vasodilation which comprises administering perorally a compound having the following formula:

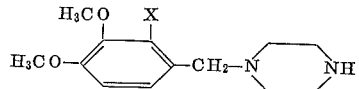

wherein X is selected from the group consisting of hydrogen and methoxy to persons suffering from peripheral circulatory disorders.

2. A method of producing peripheral vasodilation which comprises administering perorally 3',4'-dimethoxy-benzyl piperazine to persons suffering from peripheral circulatory disorders.

3. A method of producing peripheral vasodilation which comprises administering perorally 2',3',4'-trimethoxy-benzyl piperazine to persons suffering from peripheral circulatory disorders.

4. A method of producing peripheral vasodilation which comprises administering perorally 3',4'-di-methoxy-benzyl-piperazine hydrochloride to persons suffering from peripheral circulatory disorders.

5. A method of producing peripheral vasodilation which comprises administering perorally 2',3',4'-tri-methoxy-benzyl-piperazine hydrochloride to persons suffering from peripheral circulatory disorders.

6. A vasodilator composition in unit dosage form for oral administration, containing as essential ingredient therein from about 1 mg. to about 10 mg. of a member selected from the group consisting of 3',4'-dimethoxy-benzyl and 2',3',4'-trimethoxy-benzyl piperazines and the hydrochloric acid salt thereof, together with a solid pharmaceutical carrier.

7. A vasodilator composition in tablet form, for oral administration, containing as essential ingredient therein from about 1 mg. to 2 mg. of 3',4'-dimethoxy benzyl piperazine dihydrochloride with a solid pharmaceutical carrier.

8. A vasodilator composition in tablet form, for oral administration, containing as essential ingredient therein from about 1 mg. to 2 mg. of 2',3',4'-trimethoxy benzyl piperazine dihydrochloride with a solid pharmaceutical carrier.

References Cited by the Examiner
UNITED STATES PATENTS

| | | | |
|---|---|---|---|
| 2,709,169 | 5/1955 | Morren | 260—268 |
| 2,858,312 | 10/1958 | Olin | 167—65 |

JULIAN S. LEVITT, *Primary Examiner.*

FRANK CACCIAPAGLIA, Jr., *Examiner.*

L. RANDALL, *Assistant Examiner.*